(12) United States Patent
Carson et al.

(10) Patent No.: US 7,631,008 B2
(45) Date of Patent: Dec. 8, 2009

(54) SYSTEM AND METHOD FOR GENERATING FUNCTIONS TO PREDICT THE CLICKABILITY OF ADVERTISEMENTS

(75) Inventors: Chad Carson, Cupertino, CA (US); Ashvin Kannan, Sunnyvale, CA (US); Erick Cantu-Paz, Sunnyvale, CA (US); Rukmini Iyer, Los Altos, CA (US); Pero Subasic, Santa Clara, CA (US); Christopher C. LuVogt, Sunnyvale, CA (US); Christopher Leggetter, Belmont, CA (US); Jan Pedersen, Los Altos Hills, CA (US); David Cho-Lun Ku, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 449 days.

(21) Appl. No.: 11/479,186

(22) Filed: Jun. 29, 2006

(65) Prior Publication Data
US 2007/0112840 A1  May 17, 2007

Related U.S. Application Data

(63) Continuation-in-part of application No. 11/281,919, filed on Nov. 16, 2005.

(51) Int. Cl.
G06F 17/30  (2006.01)

(52) U.S. Cl. ............................ 707/102; 707/3; 715/812; 705/10

(58) Field of Classification Search ................. 707/2–5, 707/100, 104.1, 102; 705/10–14; 715/812; 345/160, 163
See application file for complete search history.

(56) References Cited

U.S. PATENT DOCUMENTS

2007/0022005 A1*  1/2007  Hanna .......................... 705/14
2007/0162329 A1*  7/2007  Lee .............................. 705/14

* cited by examiner

Primary Examiner—Cheryl Lewis
(74) Attorney, Agent, or Firm—Seth H. Ostrow; Ostrow Kaufman & Frankl LLP

(57) ABSTRACT

The present invention is directed towards systems and methods for predicting a frequency with which an advertisement displayed in response to a query will be selected. The method of the present invention comprises receiving analytics data associated with a display of one or more advertisements in response to one or more queries. One or more features associated with the one or more advertisements displayed in response to the one or more queries are identified. One or more functions are generated for predicting a frequency with which a given advertisement displayed in response to a query will be selected using the analytics data and features associated with the one or more advertisements displayed in response to the one or more queries.

62 Claims, 6 Drawing Sheets

SYSTEM AND METHOD FOR GENERATING FUNCTIONS TO PREDICT THE CLICKABILITY OF ADVERTISEMENTS

This is a Continuation-in-Part of co-pending U.S. patent application Ser. No. 11/281,919 entitled "SYSTEM AND METHOD FOR REVENUE BASED ADVERTISEMENT PLACEMENT," filed Nov. 16, 2005, the disclosure of which is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO RELATED APPLICATIONS

This application is related to the following pending applications, each of which is hereby incorporated herein by reference in its entirety:

U.S. patent application Ser. No. 11/334,096, entitled "MATCHING AND RANKING OF SPONSORED SEARCH LISTINGS INCORPORATING WEB SEARCH TECHNOLOGY AND WEB CONTENT," filed Jan. 18, 2006; and U.S. patent application Ser. No. 10/424,170 U.S. Pat. No. 7,197,497, entitled "METHOD AND APPARATUS FOR MACHINE LEARNING A DOCUMENT RELEVANCE FUNCTION," filed Apr. 25, 2003.

FIELD OF THE INVENTION

The invention disclosed herein relates generally to the distribution of advertisements in response to search requests. More specifically, the invention relates to the generation of a predictive clickability function that may be used to determine the frequency with which a given advertisement will be selected in response to a search request comprising a given query.

BACKGROUND OF THE INVENTION

Advertisements are commonly used on the Internet to promote various products and services. Advertisements may comprise banner ads, links to web pages, images, video, text, etc. The various advertisements used to promote products on the Internet may be displayed according to a variety of formats, such as in conjunction with a ranked result set in response to a query, embedded in a web page, a pop-up, etc. The advertisements displayed to a user of a client device may be selected, redirecting the user to a website providing the product or service advertised.

Client devices, communicatively coupled to a network such as the Internet, are capable of accessing various websites that may display advertisements. For example, a user of a client device may submit a search query comprising one or more terms to a search engine, which causes the search engine to retrieve a result set comprising links to content, as well as advertisements responsive to the search terms provided by a user. The search engine displays the result set that it generates to a user who may then select or view items in the result set, including one or more advertisements.

Different advertisements may be more profitable or less profitable for a search engine provider to display as the amount paid by each advertiser for displaying an advertisement varies. Additionally, because a search engine provider may charge an advertiser a fee for each advertisement selected by a user, the frequency with which an advertisement is selected (e.g., the "clickability" of an advertisement) may be a significant factor in selecting which advertisements to display in response to a query, within a web page, as a pop-up, etc. Moreover, advertisers may have a plurality of advertisements pertaining to a particular product or service, whereby the advertiser measures the success of an advertisement by examining the number of users who select the advertisement when displayed in response to a given search request. Because users may be more responsive to a particular advertisement among a plurality of advertisements pertaining to a similar product or service, the advertiser may desire to display the advertisements that are the most likely to be selected in response to a given search request in order to increase the likelihood that users purchase the advertiser's products or services.

Current techniques for determining the clickability of advertisements utilize historical click through data of advertisements. Historical click through data indicates the frequency with which one or more advertisements were selected when displayed in response to a query, as a pop-up, etc. The use of historical click through data to determine the clickability of a given advertisement in response to a given query, however, requires the availability of click through data for the given advertisement. Therefore, the clickability of an advertisement may only be ascertained after a given advertisement has been distributed in response to a given query. Because the distribution of advertisements often involves the expenditure of financial resources, both search engine providers and advertisers may wish to ascertain the clickability of a given advertisement in response to a given query prior to expending financial resources on the advertisement.

While current techniques provide for the determination of the clickability of a given advertisement after click through data has been retrieved for the advertisement, current techniques fail to provide search engine providers and advertisers with a prediction or estimate of the clickability of a given advertisement prior to the retrieval of click through data for the advertisement. In order to overcome shortcomings with existing techniques, embodiments of the present invention provide systems and methods for calculating the predicted clickability of a given advertisement displayed in response to a query using advertisement analytics data as input to one or more predictive clickability functions. Embodiments of the present invention also provide for the determination of historical clickability functions, as well as combinations thereof, that may be used to predict the clickability of a given advertisement when displayed in response to a given query.

SUMMARY OF THE INVENTION

The present invention is directed towards systems and methods for generating one or more functions for predicting a frequency with which an advertisement displayed in response to a query will be selected. The method of the present invention comprises receiving analytics data associated with a display of one or more advertisements in response to one or more queries. The analytics data may comprise data indicating the frequency with which a given advertisement was selected when displayed in response to a given query or data indicating the rank at which a given advertisement was displayed in response to a given query.

One or more features associated with the one or more advertisements displayed in response to the one or more queries are identified. The one or more features may comprise query-independent or query-dependent features. According to one embodiment of the invention, a query-dependent feature comprises a characteristic associated with a given advertisement and query. For example, a query dependent feature may comprise a time a given advertisement was displayed in response to a given query. Similarly, a query-dependent feature may comprise a type of match with which a given advertisement was retrieved in response to a given query, or the Internet Protocol ("IP") address of a user that generated a given query. A query-dependent feature may further comprise information associated with a user that generated a given query or selected an advertisement displayed in response to the query. Information associated with a user may comprise a frequency with which a user selected one or more advertisements during a given time period. Additionally, information associated with a user may comprise information identifying one or more preferences of a user or a geographic location of a given user.

A query-independent feature comprises a characteristic associated with a given advertisement. According to one embodiment, a query-independent feature comprises information associated with content corresponding to a given advertisement, such as a landing page associated with a given advertisement.

The method of the present invention further comprises generating one or more functions for predicting a frequency with which a given advertisement displayed in response to a query will be selected using the analytics data and features associated with the one or more advertisements displayed in response to the one or more queries. According to one embodiment, the one or more functions are generated using one or more actual clickability scores calculated for the one or more advertisements displayed in response to the one or more queries. The one or more actual clickability scores may be calculated using the analytics data associated with the one or more advertisements. According to one embodiment, an actual clickability score comprises a quotient of a normalized click through rate of a given advertisement displayed in response to a given query and an average normalized click through rate of one or more advertisements displayed in response to the query. Alternatively or in conjunction with the foregoing, an actual clickability score may be calculated using information from a human editor.

The one or more functions generated may be generated through the use of machine learning using the actual clickability scores and the features associated with the one or more advertisements displayed in response to the one or more queries. The functions may be generated using a variety of machine learning techniques, including, but not limited to, boosted decision trees, neural networks, and linear regression analysis.

According to one embodiment, one or more advertisements associated with a given classification are identified and used to generate one or more functions through the use of machine learning using one or more features common to the advertisements associated with the classification. According to another embodiment, a comparison of two or more advertisements displayed in response to a given query is performed and used to identify one or more features unique to a given advertisement. The one or more functions may be generated through the use of machine learning using the one or more features identified as unique to a given advertisement. The one or more functions generated may also be generated using information associated with one or more advertisements with which a given advertisement is displayed or information for one or more advertisers associated with one or more advertisements.

According to a further embodiment, the method of the present further comprises generating an aggregate clickability score for the one or more advertisements. Generating an aggregate clickability score may comprise generating a historical clickability for the one or more advertisements using the analytics data associated with the one or more advertisements. Additionally, generating an aggregate clickability score may comprise generating a predicted clickability score for the one or more advertisements using the one or more functions for predicting a frequency with which a given advertisement displayed in response to a query will be selected. The historical clickability score and the predicted clickability score may be combined to generate an aggregate clickability score. The historical clickability scores associated with the one or more advertisements may also be used generate one or more functions for predicting the frequency with which a given advertisement displayed in response to a query will be selected through the use of machine learning.

The present invention is further directed towards a system for generating one or more functions for predicting a frequency with which an advertisement displayed in response to a query will be selected. The system of the present invention comprises an analytics data store operative to store analytics data associated with one or more advertisements displayed in response to one or more queries. The analytics data store is operative to store analytics data indicating a frequency with which an advertisement was selected in response to a given query, as well as the rank at which an advertisement was displayed in a ranked list of advertisements.

A feature component is operative to identify features of the one or more advertisements displayed in response to the one or more queries. The features identified by the feature component may comprise query-dependent and query-independent features. Query dependent features may include, but are not limited to, a time a given advertisement was displayed in response to a given query, a type of match with which a given advertisement was retrieved in response to a given query, or a geographic location associated with a given advertisement displayed in response to a given query. A query dependent feature may also comprise information associated with a user that generated a given query or selected an advertisement displayed in response to the query. Information associated with a user may comprise information including, but not limited to, an Internet Protocol ("IP") address of a user, a frequency with which a user selected one or more advertisements during a given time period, or one or more preferences associated with a user. A query-independent feature may comprise a characteristic associated with a given advertisement. For example, a query-independent feature may comprise information associated with content corresponding to a given advertisement, such as a landing page associated with an advertisement.

The system of the present invention further comprises a clickability engine operative to generate one or more functions for predicting a frequency with which a given advertisement displayed in response to a query will be selected using the analytics data and features associated with the one or more advertisements displayed in response to the one or more queries. According to one embodiment, the clickability engine is operative to calculate an actual clickability score for the one or more advertisements displayed in response to the one or more queries, wherein an actual clickability score may be calculated using the analytics data associated with the one or more advertisements or information from a human editor.

The clickability engine is operative to generate one or more functions for predicting a frequency with which a given advertisement displayed in response to a given query will be selected through the use of machine learning. According to one embodiment, the clickability engine is operative to construct one or more boosted decision trees or neural networks from the actual clickability scores and features associated with the one or more advertisements displayed in response to the one or more queries and generate one or more functions through the use of machine learning. According to another embodiment, the clickability engine is operative to generate one or more functions through the use of machine learning using a linear regression analysis of the actual clickability scores and features associated with the one or more advertisements displayed in response to the one or more queries.

According to one embodiment, the clickability engine is further operative to generate an aggregate clickability score for the one or more advertisements. An aggregate clickability score may be generated using a combination of a historical clickability score, generated using the analytics data associated with the one advertisements, and a predicted clickability score, generated using the one or more functions for predicting a frequency with which a given advertisement displayed in response to a query will be selected. The historical clickability scores of the one or more advertisements may also be used to generate one or more functions for predicting the frequency with which a given advertisement displayed in response to a query will be selected through the use of machine learning.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
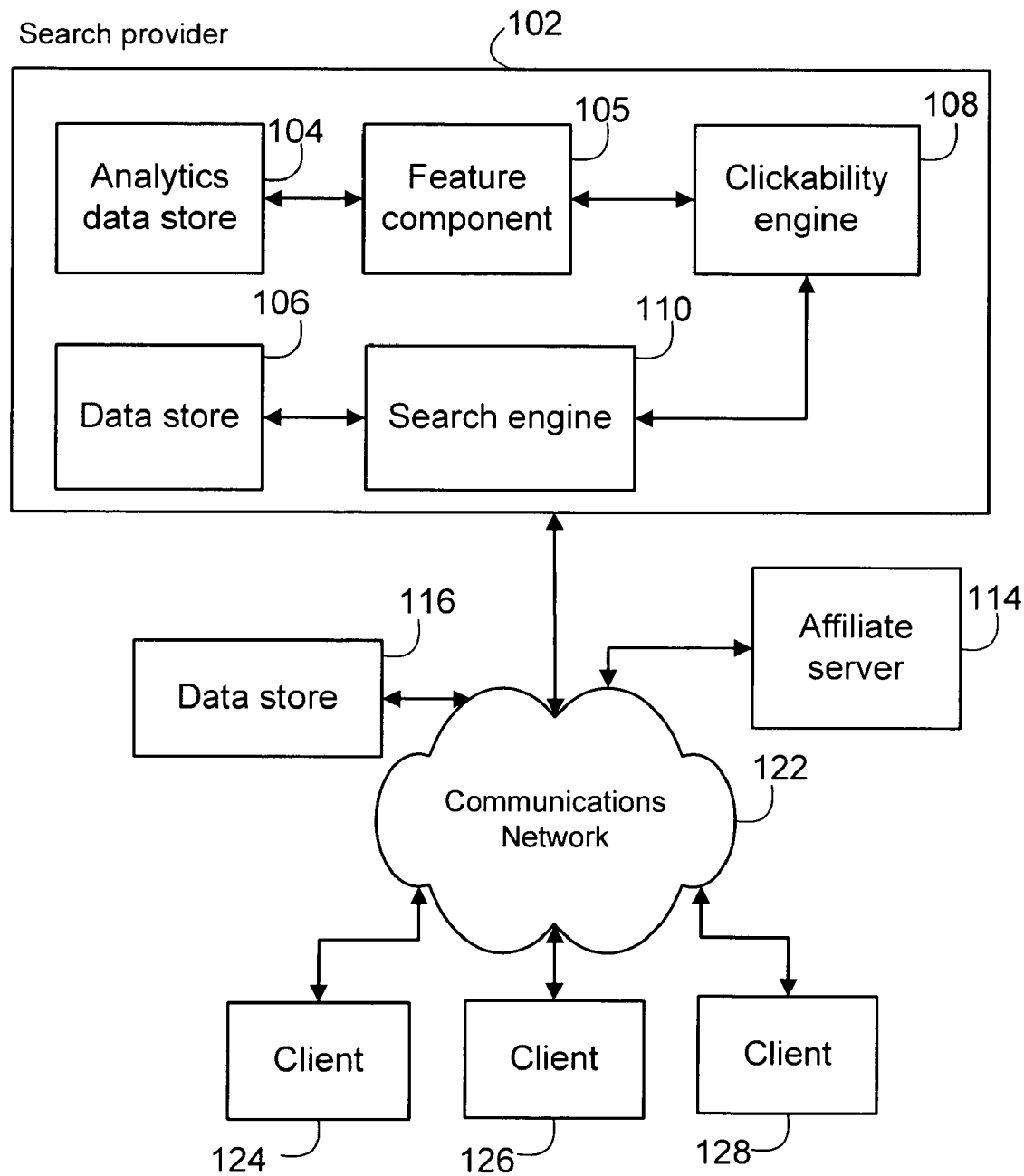
FIG. 1 is a block diagram presenting a system for generating one or more functions that may be used to predict the clickability of one or more advertisements displayed in response to one or more queries according to one embodiment of the present invention.

FIG. 1 presents a block diagram depicting one embodiment of a system for generating one or more functions that may be used to predict the clickability of a given advertisement, wherein the clickability of a given advertisement comprises a numerical value indicating the frequency with which the advertisement will be selected when displayed in response to a given query. According to the embodiment illustrated in FIG. 1, client devices 124, 126 and 128 are communicatively coupled to a network 122, which may include a connection to one or more local and/or wide area networks, such as the Internet. According to one embodiment of the invention, a client device 124, 126 and 128 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

A user of a client device 124, 126, and 128 communicatively coupled to the network 122 may transmit a search query comprising one or more terms to a search provider 102. Alternatively, a user of a client device 124, 126, and 128 communicatively coupled to the network 122 may transmit a search query to an affiliate server 114, which may be operative to deliver the search query to the search provider 102. For example, an affiliate server 114 such as AOL or MSN may provider users of client devices 124, 126, and 128 with the ability to conduct searches via a search engine using search queries. Upon receiving a given search query, an affiliate server 114 may deliver the query to the search provider 102.

A typical query received from a user of a client device 124, 126, and 128 has one or more terms. For example, the query "wireless notebook computer" contains three terms and may be referred to as a three-term query. Similarly, queries containing only one term are referred to as one-term queries, queries containing two terms are two-term queries, etc. A space or other delimiter character may used to identify the individual terms comprising a given query.

Queries received by the search provider 102 are delivered to a search engine 110 operative to identify one or more advertisements responsive to a given received query. The search engine 110 may examine one or more local or remote data stores 106 and 116, respectively, to identify one or more advertisements responsive to a given received query. Local 106 and remote 116 data stores are operative to maintain one or more advertisements and may comprise one or more accessible memory structures such as a database, CD-ROM, tape, digital storage library, etc. Local and remote data stores 106 and 116 may be implemented as databases or any other type of storage structures capable of providing for the retrieval and storage of a variety of data types. The content data stores 106 and 116 may store a variety of advertisement data types including websites, text, video, images, banners, links, etc.

Advertisements maintained in data stores 106 and 116 may be maintained in groups according to advertiser, product, category, or a combination thereof.

Advertisements maintained in data stores 106 and 116 may be maintained according to an organizational hierarchy with multiple levels of advertisement groupings. According to one embodiment, data stores 106 and 116 maintain a plurality of user accounts, wherein an account comprises the one or more advertisements associated with a given advertiser. An account associated with a given advertiser may be partitioned into one or more campaigns, wherein a campaign comprises one or more advertisements directed towards advertising a similar product or service. For example, a user account associated with an advertiser that sells computer products may be partitioned into two campaigns, wherein the first campaign may comprise one or more advertisements directed at selling notebook computers and the second campaign may comprise one or more advertisements directed at selling desktop computers. The one or more campaigns associated with an account of a given advertiser may be further partitioned into one or more advertisement groups, wherein an advertisement group comprises a group of advertisements with one or more common characteristics. For example, the abovementioned campaign directed at selling notebook computers may be partitioned into one or more advertisement groups based upon the one or more manufacturers associated with the one or advertisements.

The search engine 110 at the search provider 102 may utilize one or more techniques to retrieve and generate a result set comprising one or more advertisements from data stores 106 and 116 responsive to a given query. Additionally, the search engine 110 may identify the type of match of a given advertisement with respect to a received query. For example, the search engine 110 may determine the frequency with which the one or more terms comprising a given query appear in a given advertisement or the content associated with a given advertisement. Similarly, the one or more advertisements maintained in data stores 106 and 116 may be associated with one or more bidded search terms, wherein a bidded search term comprises a term for which an advertiser has provided a bid.

The search engine 110 may identify the one or more advertisements with associated bidded search terms that match or are similar to the terms comprising a given query, and may select one or more of the advertisements using the bid amount for the bidded search terms associated with the advertisement to generate a result set. Additionally, the search engine 110 may utilize the profile of a given user to retrieve one or more advertisements to generate a result, such as retrieving advertisements of a type frequently selected by the user. Alternatively, or in conjunction with the foregoing, the search engine 110 may identify one or more advertisements responsive to a given query for products or services from advertisers in a given geographic location. Those of skill in the art recognize the various techniques that may be used by a search engine to identify one or more advertisements comprising a result set responsive to a given query comprising one or more terms.

The search engine 110 may thereafter rank the one or more retrieved advertisements in the result set responsive to the received query using one or more ranking techniques. For example, the search engine 110 may rank the one or more retrieved advertisements using the frequency with which the one or more terms comprising the received query appear in the advertisements or in the content associated with the advertisements. Alternatively, the search engine 110 may rank the one or more retrieved advertisements based upon a quality score associated with a given advertisement. For example, an index (not illustrated) may be maintained identifying the quality of a given advertisement, such as if the advertisement is associated with reliable content, questionable content, etc. The search engine 110 may utilize the quality scores associated with the one or more retrieved advertisements to generate a ranking of the advertisements.

The search engine 110 may also rank the one or more retrieved advertisements based upon the type of match that resulted in the retrieval of the one or more advertisements. For example, the search engine 110 may rank the one or more advertisements retrieved based upon a user's profile higher than the one or more advertisements retrieved based upon the bidded search terms associated with the advertisements. Those of skill in the art recognize other techniques for ranking one or more advertisements.

The one or more advertisements comprising a result set responsive to the received query may be delivered to an analytics data store 104 at the search provider. The analytics data store 104 may be implemented as a database or any other type of data storage structure capable of providing for the retrieval and storage of data for one or more advertisements comprising a result set responsive to a given query received from a client device 124, 126, and 128. The analytics data store 104 at the search provider is operative to maintain analytics data for the one or more advertisements comprising a result set responsive to a given search query comprising one or more terms received from a given client device 124, 126, and 128.

The analytics data store 104 may maintain query/advertisement pairs indicating the query that resulted in the retrieval of a given advertisement. For example, the analytics data store 104 may maintain information indicating the query that resulted in the retrieval of the one or more advertisements comprising a result set. The analytics data store 104 may be implemented as accessible memory structure such as a database, CD-ROM, tape, digital storage library, etc. The analytics data store 104 is operative to maintain analytics data associated with one or more advertisements displayed in response to a given search query comprising one or more terms.

One or more of the ranked advertisements within the result set responsive to the query received from the client device 124, 126, and 128 may thereafter be delivered via the network 122 to the client device 124, 126, and 128 with which the request originated. For example, the one or more advertisements above a given rank threshold may be delivered to a client device 124, 126, and 128. Alternatively, or in conjunction with the foregoing, the one or more ranked advertisements within the result set responsive to the query received, or the one or more advertisements above a given rank threshold, may be delivered via the network 122 to one or more affiliate servers 114 that may forward the one or more ranked advertisements to one or more client devices 124, 126, and 128.

A user of a client device 124, 126, and 128 may select one or more of the ranked advertisements using a selection device such as a mouse or a keyboard. Data regarding the selection of a given advertisement by a user may be retrieved and delivered to the analytics data store at the search provider 104. The analytics data store 104 is operative to maintain a plurality of information associated with the selection of one or more advertisements within a result set responsive to a given query received from a client device 124, 126, and 128.

According to one embodiment of the invention, the information associated with the selection of an advertisement by a given user delivered to the analytics data store 104 comprises the rank at which the advertisement was displayed in a ranked list of advertisements. Additionally, the analytics data store 104 may maintain information identifying the frequency with which one or more users selected an advertisement in response to a given query, as well as the one or more ranks at which the advertisement was displayed in response to the query.

The analytics data store 104 may further maintain information associated with the context of a given advertisement displayed in response to a given query. The context of a given advertisement displayed in response to a given query may include, but is not limited to, information associated with displaying the advertisement, such as information retrieved from a user profile or information associated with the time a given advertisement was displayed in response to a given query. For example, the context information may comprise information obtained from a user profile, such as geographic information associated with the user that generated the query that resulted in the display of a given advertisement. Similarly, the context information associated with a given advertisement may comprise information identifying the time of day a given advertisement was displayed in response to a query generated by a given user. Alternatively, or in conjunction with the foregoing, the context information associated with a given advertisement may comprise information associated with a given user that selected the advertisement, such as the IP address of the user or the frequency with which the user selects one or more advertisements. The analytics data store 104 is operative to maintain the plurality of data associated with a given advertisement displayed in response to a given query.

The context information associated with a given advertisement may further comprise information associated with the one or more advertisements displayed in conjunction with the advertisement. For example, a given advertisement displayed within a web page may be displayed in conjunction with one or more additional advertisements. Information associated with the selection of the advertisement, as well as information associated with the one or more advertisements displayed in conjunction with the selected advertisement, such as features associated with the one or more advertisements, may also be delivered to and maintained in the analytics data store 104.

The analytics data store 104 is operative to deliver the one or more query/advertisement pairs comprising a result set, context information, and corresponding analytics data to a feature component 105. The feature component 105 is operative to identify features associated with the one or more query/advertisement pairs maintained in the analytics data store 104. A feature may comprise a means of quantifying an aspect of the relationship of a given advertisement to a given query, or of an aspect of the advertisement itself. Features that represent a value based only on a given advertisement are referred to as query-independent features. For example, a query-independent feature may comprise a determination of whether the one or more terms appearing in a given advertisement match or are similar to the one or more "bidded terms" associated with the advertisement. Similarly, a query-independent feature may comprise a determination of whether the URL associated with a given advertisement is the homepage of a given website. Additionally, a query independent feature may comprise a determination of whether the one or more terms appearing in a given advertisement appear within the content associated with the advertisement (e.g., the landing page associated with the advertisement).

Features that represent a value based upon both a given advertisement and a given query are referred to as query-dependent features. For example, a query-dependent feature may comprise the extent to which a bidded search term associated with a given advertisement matches or is similar to the one or more terms comprising the query. A query-dependent feature may also comprise a determination of the frequency with which the one or more terms comprising a given query appear in the web page associated with a given advertisement. Similarly, a query-dependent feature may comprise the frequency with which the one or more terms comprising a given query appear in the title or abstract of the web page associated with a given advertisement. Alternatively, or in conjunction with the foregoing, a query-dependent feature may comprise a determination of the presence or absence of the one or more terms comprising a given query in the web page associated with a given advertisement.

The one or more query/advertisement pairs and associated analytics data, context information, and feature information may be periodically delivered to a clickability engine 108. According to one embodiment of the invention, the clickability engine 108 is operative to utilize the one or more query/advertisement pairs and associated context information, analytics data, and feature information to generate one or more functions that may be used to predict the clickability of a given advertisement displayed in response to a given query. The one or more query/advertisement pairs and associated analytics data, context information, and feature information periodically delivered to the clickability engine 108 may be referred to as a training set of data as the data is used to "train" one or more predictive clickability functions generated by the clickability engine 108.

The clickability engine 108 is operative to utilize one or more techniques to generate and train one or more predictive clickability functions using the data associated with the one or more query/advertisement pairs. According to one embodiment, the clickability engine 108 calculates an actual clickability score for the one or more query/advertisement pairs, wherein an actual clickability score for a given query/advertisement pair comprises a numerical value indicating the normalized rate at which the advertisement was selected in response to the query in a given context. The clickability engine 108 uses the actual clickability score, as well as the one or more query-independent and query-dependent features associated with the query/advertisement pair, to train one or more predictive clickability functions.

According to one embodiment of the invention, the clickability engine 108 generates an actual clickability score for a given advertisement, query, context tuple, wherein a context comprises the plurality of data associated with the display of a given advertisement in response to a given query. The clickability engine 108 may utilize the actual clickability scores, as well as the query-dependent and query-independent features associated with a given query/advertisement pair, to train one or more predictive clickability functions. For example, the clickability engine 108 may determine that advertisements selected by users in a first geographic location, as indicated by the context information for a given query/advertisement pair, received greater actual clickability scores than advertisements selected by users in a second geographic location.

Similarly, the clickability engine 108 may determine that advertisements displayed during the hours of 9:00 a.m. through 11:00 a.m., as indicated by the context information associated with a given query/advertisement pair, are more frequently selected and receive greater actual clickability scores than advertisements displayed during the hours of 1:00 p.m. through 3:00 p.m. The clickability engine 108 may utilize the context information associated with the one or more query/advertisement pairs to train one or more predictive clickability functions. The one or more predictive clickability functions may be used to generate accurate predicted clickability scores for advertisements displayed in response to one or more queries.

Additionally, the clickability engine 108 may utilize information associated with the one or more advertisements displayed in conjunction with a given query/advertisement pair to train one or more predictive clickability functions. For example, a given advertisement displayed in response to a given query and selected by a user may be displayed in conjunction with one or more advertisements. Information associated with the one or more advertisements displayed in conjunction with the selected advertisement may be used to train one or more predictive clickability functions. For example, one or more features unique to the selected advertisement, or one or more features unique to the one or more advertisements not selected may be used to train one or more predictive clickability functions.

The clickability engine 108 may utilize one or more machine learning methodologies for generating one or more predictive clickability functions. For example, the clickability engine 108 may use a linear regression analysis of the actual clickability scores and the features associated with the one or more query/advertisement pairs to generate one or more predictive clickability functions. Similarly, the clickability engine 108 may utilize the actual clickability scores and features associated with the one or more query/advertisement pairs to construct one or more boosted decision trees, which may be used to generate one or more predictive clickability functions. Alternatively, or in conjunction with the foregoing, the clickability engine 108 may utilize the data associated with the one or more query/advertisement pairs to construct a neural network that may be used to generate one or more predictive clickability functions. Those of skill in the art recognize other machine learning techniques that may be used in conjunction with a training set of data to generate a predictive clickability function.

The clickability engine 108 is further operative to utilize a loss function to determine the accuracy of the one or more predictive clickability functions it generates. According to one embodiment of the invention, the clickability engine 108 selects one or more query/advertisement pairs and calculates the actual clickability score of the one or more query/advertisement pairs using the data maintained in the analytics data store 104. The clickability engine 108 further calculates the predicted clickability score of the one or more query/advertisement pairs selected using the one or more predictive clickability functions generated.

The clickability engine 108 thereafter utilizes a loss function to perform a comparison of the actual clickability score and the predicted clickability score, as calculated by a given predictive clickability function, for the one or more selected query/advertisement pairs. The loss function may identify the one or more predictive clickability functions that yield a smallest difference between the actual clickability score and predicted clickability score of the one or more query/advertisement pairs. The clickability engine 108 may select and store the one or more predictive clickability functions identified by the loss function as yielding a smallest difference. For example, the clickability engine 108 may select the one or more predictive clickability functions yielding a difference between an actual clickability score and predicted clickability score for one or more query/advertisement pairs below a given threshold. The one or more predictive clickability functions that the clickability engine 108 selects and stores may be used to generate an indication of the clickability of a given query/advertisement pair for which no analytics data is available.

As previously described, the search provider 102 may be operative to periodically deliver the data associated with one or more query/advertisement pairs to the clickability engine 108 in order to provide the clickability engine with additional training data. Periodically providing the clickability engine 108 with additional training data allows the clickability engine 108 to modify existing predictive clickability functions so as to improve the accuracy with which the clickability engine 108 predicts the clickability of a given advertisement displayed in response to a given query. According to one embodiment of the invention, the search provider 102 is operative to deliver the data for one or more query/advertisement pairs to the clickability engine 108 upon the expiration of a given period of time. For example, the search provider 102 may be configured to deliver the data for one or more query/advertisement pairs to the clickability engine 108 every twenty four ("24") hours. According to another embodiment of the invention, the search provider 102 is operative to deliver the data for one or more query/advertisement pairs to the clickability engine 108 upon the receipt of a given threshold of data.

The clickability engine 108 is further operative to calculate a historical clickability score for the one or more query/advertisement pairs. According to one embodiment of the invention, a historical clickability score may be calculated using the analytics data associated with a given advertisement, which may include the utilization of analytics data for one or more advertisements identified as related to the given advertisement. Advertisement relatedness may be determined using similarity or relatedness techniques known to those of skill in the art. As previously described, data stores 106 and 116 may maintain advertisements in a hierarchal organization with multiple levels, such as accounts, campaigns, and advertisement groups. A weighted sum of the click through rate at the one or more levels of the organizational hierarchy associated with a given advertisement may be used to calculate an historical clickability score for a given advertisement displayed in response to a given query.

The analytics data associated with a given advertisement displayed in response to a given query, which may include analytics data associated with one or more advertisements identified as related to the given advertisement, may be used to calculate the click through rate for the advertisement. Additionally, a confidence score is assigned to the calculated click through rate, wherein a confidence score comprises a numerical value indicating a level of confidence in the calculated click through rate. According to one embodiment of the invention, the confidence score associated with a given calculated click through rate is based upon the quantity of analytics data used to calculate the click through rate. Alternatively, or in conjunction with the foregoing, a confidence score may be based upon the level within the organizational hierarchy from which the analytics data was retrieved to calculate a given click through rate. Similarly, the confidence score may be based on the quality of analytics data used to calculate the click through rate.

A confidence score threshold may be used in order to increase the accuracy of the historical clickability score calculated for a given advertisement. For example, a click through rate may be calculated for a given advertisement displayed in response to a given query. A confidence score may be assigned to the calculated click through rate based upon the quantity of analytics data associated with the advertisement, as well as the level within the organizational hierarchy from which the analytics data was retrieved. If the confidence score assigned to the calculated click through rate does not satisfy the confidence score threshold, analytics data from another level within the organizational hierarchy associated with the advertisement may be retrieved and used to calculate an additional click through rate.

According to one embodiment, analytics data from the advertisement group to which the advertisement belongs may be retrieved and used to calculate a click through rate. The click through rate calculated for the advertisement group to which the advertisement belongs may also be assigned a confidence score. If the confidence score associated with the advertisement group click through rate and the confidence score associated with the advertisement click through rate does not satisfy the confidence score threshold, click through data (e.g., rates) from one or more additional levels within the organizational hierarchy may be selected until the confidence score threshold is reached.

The one or more click through rates available at the one or more levels of the organizational hierarchy may be combined to calculate an historical clickability score. According to one embodiment of the invention, the historical clickability score associated with a given advertisement displayed in response to a given query may be combined with the predicted clickability score for the advertisement to generate an aggregate clickability score. Utilization of historical analytics data and a predictive clickability function for a given advertisement displayed in response to a given query increases the reliability of the calculated aggregate clickability score.

According to one embodiment of the invention, the historical clickability scores associated with one or more advertisements displayed in response to one or more queries may further be used to train one or more predictive clickability functions in order to generate accurate predicted clickability scores. For example, as previously described, a historical clickability score is calculated using the analytics data associated with a given advertisement displayed in response to a given query. The historical clickability score of a given advertisement may be used to train a predictive clickability function so as to minimize the difference between a predicted clickability score generated for the advertisement using the predictive clickability function and the historical clickabilty score associated with the advertisement.

Alternatively, or in conjunction with the foregoing, a given predictive clickability function may be trained utilizing the historical clickability score associated with a given advertisement displayed in response to a given query and one or more historical clickability thresholds. For example, a given predictive clickability function may be trained so as to appropriately discount predicted clickability scores for advertisements that are associated with historical clickability scores below a given historical clickability threshold. Similarly, a given predictive clickability function may be trained so as to appropriately increase clickability scores for advertisements that are associated with a historical clickability score exceeding a given historical clickability threshold.

Figure 2:
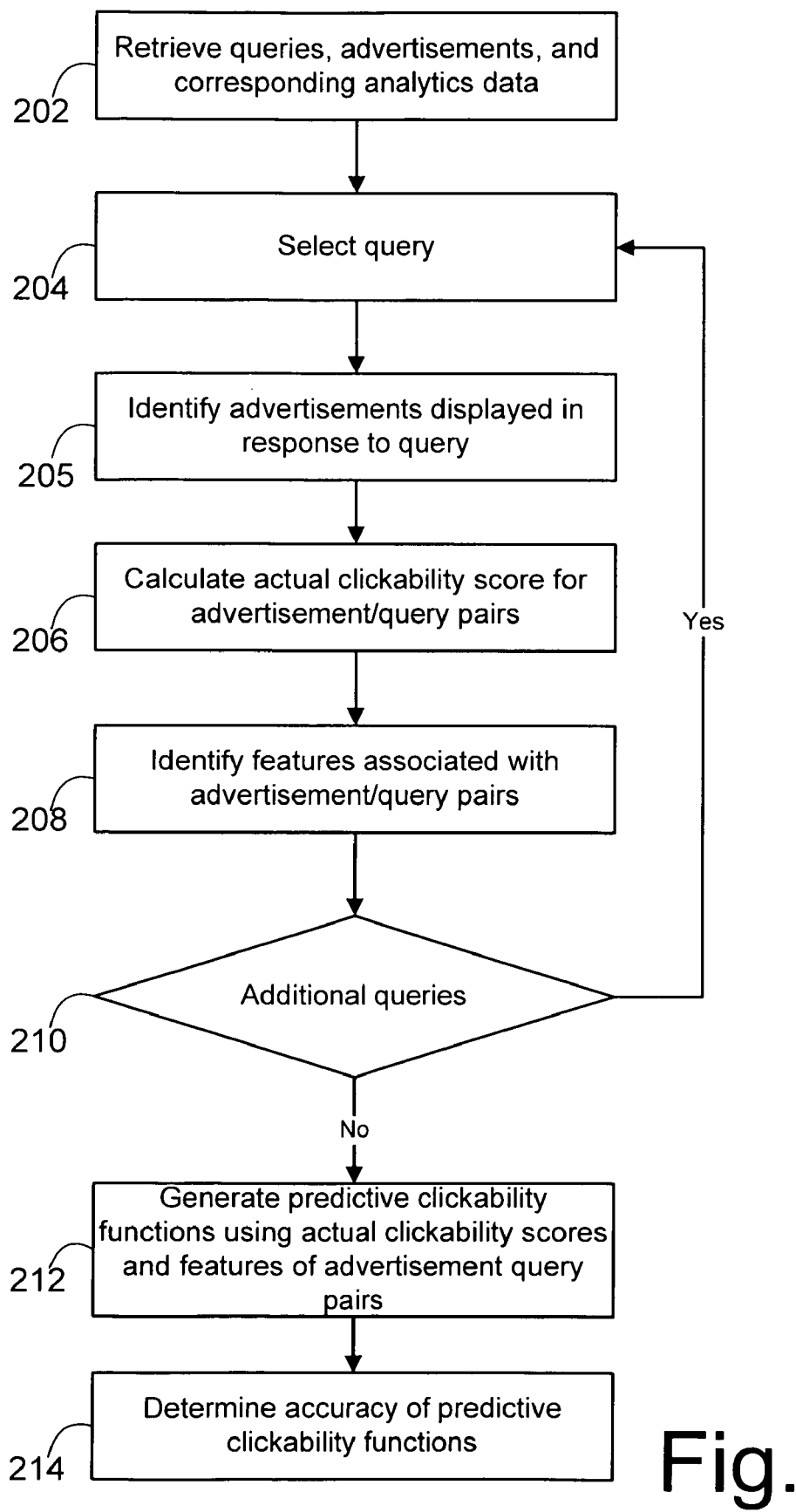
FIG. 2 is a flow diagram presenting a method for generating one or more functions that may be used to predict the clickability of one or more advertisements displayed in response to one or more queries according to one embodiment of the present invention.

FIG. 2 is a flow diagram presenting a method for generating one or more predictive clickability functions that may be used to predict the clickability of one or more advertisements associated with one or more queries. According to the embodiment illustrated in FIG. 2, one or more queries and advertisements, and analytics data corresponding to the one or more queries and advertisements, are retrieved, step 202. The queries, advertisements and corresponding analytics data may be referred to as a training set, as the queries, advertisements, and analytics data are used to train one or more functions to predict the clickability of advertisements. The analytics data corresponding to the queries and advertisements retrieved may comprise data indicating the frequency with which the one or more advertisements were selected in response to a given query, the rank at which the one or more advertisements were displayed in ranked list of advertisements, information retrieved from one or more user profiles associated with the one or more users that generated the one or more queries, etc.

A given query is selected from the one or more queries and advertisements retrieved, step 204. The one or more advertisements displayed in response to the query selected are thereafter identified, step 206. The query selected and the one or more identified advertisements comprise query/advertisement pairs. Actual clickability scores are thereafter calculated for the one or more query/advertisement pairs, step 206. According to one embodiment of the invention, an actual clickability score comprises the normalized frequency with which a given advertisement was selected (e.g., "normalized click through rate") in response to a given query in a given context. According to another embodiment of the invention, an actual clickability score comprises a scaled normalized frequency with which a given advertisement was selected in response to a given query in a given context. A scaled normalized frequency may comprise the quotient of the normalized frequency with which a given advertisement was selected in response to a given query and the normalized frequency with which the one or more advertisements displayed in response to the query were selected.

Utilizing normalized click through rates allows for an effective comparison of the one or more advertisements displayed in response to a given query at different times of the day, different positions in a ranked list, etc. For example, advertisements appearing first in a ranked list of advertisements are more likely to be selected by a user than advertisements appearing second, third, etc. Similarly, advertisements appearing to users during the hours of 9:00 AM to 11:00 AM may be selected more frequently than advertisements appearing during the hours of 9:00 PM to 11:00 PM . Normalization of the plurality of information associated with the context of a given advertisement displayed in response to a given query compensates for these and other context differences.

The actual clickability score for a given advertisement displayed in response to a given query may be calculated using the analytics data associated with the query/advertisement pair. Table A illustrates one embodiment of an equation that may be used to calculate an actual clickability score for a given query/advertisement pair.

TABLE A

Actual clickability $(Ad_i, Q)$ = Actual nCTR of $Ad_i$

In the equation presented in Table A, $(Ad_i, Q)$ is a given query/advertisement pair, wherein $Ad_i$ is a given advertisement and Q is a given query. Actual nCTR of $Ad_i$ is the normalized frequency with which advertisement $Ad_i$ was selected (normalized click through rate) when displayed in response to query Q.

As previously described, an actual clickability score may also comprise a scaled normalized frequency with which a given advertisement was selected in response to a given query. For example, the Actual nCTR of $Ad_i$ presented in Table A may be scaled using one or more scaling techniques. Table B illustrates one embodiment of an equation that may be used to scale the Actual nCTR of $Ad_i$ presented in Table A.

TABLE B $$\text{Actual clickability }(Ad_i, Q) = \frac{\text{Actual nCTR of } Ad_i}{\text{Average Actual nCTR of } Ad_i \ldots Ad_n}$$

In the equation presented in Table B, the Actual nCTR of $Ad_i$ is scaled using the average Actual nCTR of $Ad_i \ldots Ad_n$, which comprises the average normalized frequency with which the one or more advertisements displayed in response to query Q were selected. According to another embodiment of the invention, the Actual nCTR of $Ad_j$ is scaled using a weighted average Actual nCTR of advertisement $Ad_i \ldots Ad_n$. The weighted average Actual nCTR of advertisements $Ad_i \ldots Ad_n$ may comprise an average based upon the nCTR of Advertisements $Ad_i \ldots Ad_n$, and the confidence scores associated with the one or more advertisements. For example, as previously described, a confidence score associated with a given advertisement may be based upon the quantity of analytics data associated with the advertisement. The one or more advertisements $Ad_i \ldots Ad_n$ with the greatest quantity of associated analytics data, and thus, the greatest confidence scores, may be weighted accordingly when calculating an average Actual nCTR for advertisements $Ad_i \ldots Ad_n$. Similarly, the one or more advertisements $Ad_i \ldots Ad_n$ with the least quantity of associated analytics data, and thus, the lowest confidence scores, may be weighted accordingly when calculating an average Actual nCTR for advertisements $Ad_i \ldots Ad_n$.

An actual clickability score is calculated for the one or more query/advertisement pairs associated with the selected query. Additionally, query-dependent and query-independent features are identified for the one or more query/advertisement pairs, step 208. According to one embodiment of the invention, query-independent features and query dependent features are further identified for the one or more advertisements displayed in conjunction with a given query/advertisement pair. A check is performed to determine whether there are one or more additional queries in the training set of data that require analysis, step 210. If additional queries are identified in the training set as requiring analysis, another query is selected, step 204. When the one or more queries in the training set have been analyzed, the one or more query/advertisement pairs and corresponding actual clickability scores and identified features are used to generate one or more predictive clickability functions, step 212.

The one or more predictive clickability functions may be generated using a variety of machine learning techniques. According to one embodiment of the invention, one or more predictive clickability functions are generated using linear regression techniques. According to another embodiment of the invention, one or more predictive clickability functions are generated using one or more boosted trees, constructed from the plurality of data associated with the one or more query/advertisement pairs. Alternatively, or in conjunction with the foregoing, the one or more predictive clickability functions are generated using one or more neural networks, generated from the data associated with the one or more advertisement query pairs. Those of skill in the art recognize other machine learning techniques that may be used on a training set of data to generate one or more predictive clickability functions.

According to one embodiment of the invention, the one or more predictive clickability functions are trained based upon features derived from performing a comparison of one or more combinations of query/advertisement pairs. For example, the one or more features associated with a first query/advertisement pair may be compared with the one or more features associated with a second query/advertisement pair. The comparison may indicate that a given feature is unique to the first query/advertisement pair. Additionally, the comparison may indicate that the first query/advertisement pair is associated with a greater actual clickability score than the second query/advertisement pair. A given predictive clickability function may be trained utilizing the features identified as unique to the first query/advertisement pair. For example, a predictive clikability function may be trained so as to increase the predicted clickability scores for advertisements associated with the feature identified as unique to the first query/advertisement pair.

According to another embodiment of the invention, the one or more predictive clickability functions may be trained based upon features associated with one or more categories or classifications of query/advertisement pairs. A classification may comprise the one or more advertisements displayed in response to a given query according to a given match type. For example, one or more advertisements displayed in response to a given query may comprise an "exact match," wherein an exact match comprises an advertisement containing all of the one or more terms comprising a given query. Alternatively, or in conjunction with the foregoing, an exact match may comprise a landing page associated with a given advertisement containing all of the one or more terms comprising a given query.

Features common to a given group of advertisements, such as a group of exact match advertisements, may be extracted and used to train a given predictive clickability function. For example, a Term Frequency/Inverse Document Frequency ("TF/IDF") may be identified for the one or more advertisements comprising exact matches with respect to a given query. A predictive clickability function may be trained using the TF/IDF associated with the one or more advertisements comprising exact match advertisements in order to allow the predictive clickability function to more accurately predict the clickability of one or more advertisements. For example, the predictive clickabilty function may be trained so as to generate an increased predicted clickability score for an advertisement with a TF/IDF above a given threshold with respect to a given query.

A classification may further comprise one or more query/advertisement pairs wherein the advertisements are identified as semantically related to the respective query. For example, a given query may comprise the terms "laptop." An advertisement responsive to the query may comprise an advertisement associated with the terms "notebook computer." The advertisement may thus be classified as a semantically related to the query, as the terms associated with the advertisement do not exactly match the terms associated with the query, but are closely related in meaning. Features associated with the one or more query/advertisement pairs wherein the advertisements are identified as semantically related to the respective query may be used to train the one or more predictive clickability functions.

According to yet another embodiment of the invention, the one or more predictive clickability functions may be trained based upon advertiser information associated with the one or more advertisements displayed in response to a given query. For example, the one or more advertisements associated with a given advertiser may direct users to questionable or unreliable content. An index or similar storage structure may be maintained identifying advertisers that are associated with advertisements that direct users to questionable or unreliable content. The index may further indicate advertisers that are reliable or trustworthy and that are associated with advertisements that direct users to reliable content. A given predictive clickability function may be trained utilizing the advertiser information associated with a given advertisement displayed in response to a given query. For example, a given predictive clickability function may be trained so as to appropriately discount clickability scores for advertisements that are associated with one or more advertisers associated with unreliable content. Similarly, a given predictive clickability function may be trained so as to appropriately increase clickability scores for advertisements that are associated with one or more advertisers associated with reliable content.

According to a further embodiment of the invention, the one or more predictive clickability functions may be trained based upon information associated the one or more advertisements displayed in conjunction with a given advertisement displayed and selected in response to a given query. As previously described, one or more advertisements may be displayed in response to a given query. A user of a client device may select one or more of the advertisements displayed. Information associated with the one or more advertisements displayed and selected, such as features unique to such advertisements, may be used to train one or more predictive clickability functions. Similarly, information associated with the one or more advertisements displayed and not selected, such as query-independent and query-dependent features unique to such advertisements, may be used to train one or more predictive clickability functions. For example, a given predictive clickability function may be trained to appropriately increase or decrease clickability scores for advertisements displayed in the presence of one or more advertisements associated with one or more given features.

As illustrated in FIG. 2, the accuracy of the one or more predictive clickability functions is thereafter determined, step 214. According to one embodiment of the invention, the accuracy of a given predictive clickability function may be ascertained using a loss function. A loss function may be operative to determine the difference between the actual clickability score for one or more query/advertisement pairs and the predicted clickability score for the one or more query/advertisement pairs, as calculated by a given predictive clickability function.

For example, the actual clickability score for a given query/advertisement pair for which analytics data is available may comprise the numerical value "1.24." The accuracy of a given predictive clickability function may be ascertained by calculating a predicted clickability score utilizing the predictive clickability function for a query/advertisement pair for which an actual clickability score is available. With reference to the abovementioned example, the predicted clickability function for the query/advertisement pair with an actual clickability score of 1.24 may comprise the numerical value 1.42. The difference between the predicted clickability score generated by the predictive clickability function and the actual clickability score for the query/advertisement pair may be calculated and used to identify the accuracy of the predictive clickability function. The loss function may be used to determine the accuracy of the one or more predictive clickability functions generated.

Figure 3:
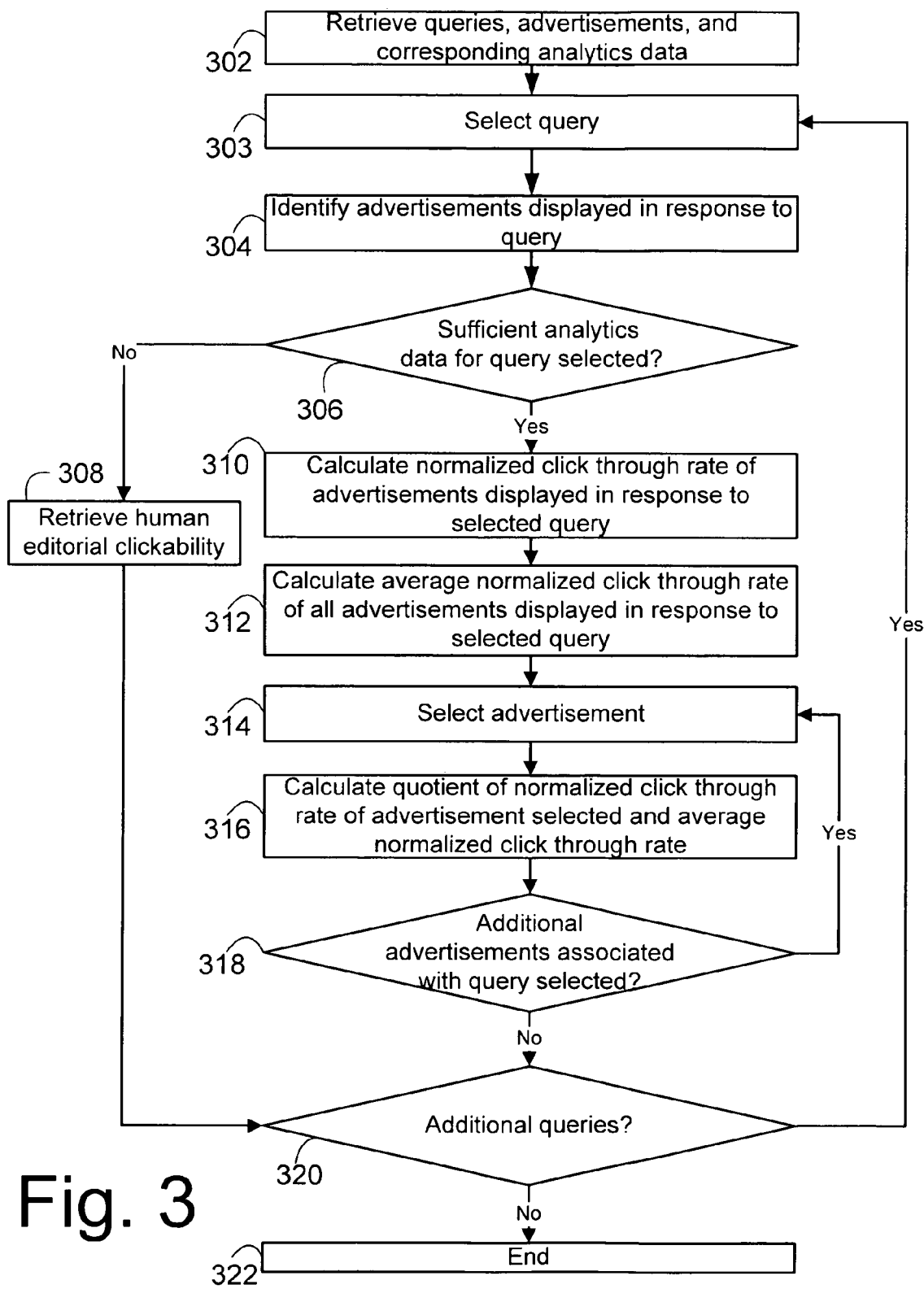
FIG. 3 is a flow diagram presenting a method for calculating the actual clickability of one or more advertisements displayed in response to a given query according to one embodiment of the present invention.

FIG. 3 is a flow diagram presenting a method for calculating the actual clickability of a given advertisement displayed in response to a given query. According to the embodiment illustrated in FIG. 3, one or more queries, advertisements, and corresponding analytics data, comprising a training set of data, are retrieved, step 302. The analytics data associated with the one or more advertisements may comprise data including, but not limited to, the frequency with which the advertisements were selected in response to a given query, as well as the rank at which the one or more advertisements were displayed in response to a given query in a ranked list of advertisements.

A given query is selected from among the one or more queries and advertisements retrieved, step 303. Thereafter, the one or more advertisements displayed in response to the query selected are identified, step 304. The query selected and the one or more advertisements identified as displayed in response to the query selected comprise query/advertisement pairs.

A check is performed to determine whether there is sufficient analytics data associated with the query selected, step 306. According to one embodiment of the invention, the sufficiency of the analytics data associated with the query selected is based upon the quantity of analytics data associated with the one or more advertisements displayed in response to the query. The quantity of analytics data for a given advertisement may comprise the frequency with which the advertisement was displayed in response to the query, or the duration of time the advertisement was displayed in response to the query. A threshold may be used to identify a minimum quantity of data associated with one or more advertisements displayed in response to a given query to comprise sufficient analytics data. For example, a threshold may indicate that in order for a given query to have a sufficient quantity of analytics data, the one or more advertisements displayed in response to the query must have been displayed at least fifty ("50") times.

Where sufficient analytics data does not exist for the query selected, a human editorial actual clickability score is retrieved for the one or more advertisements displayed in response to the query, step 308. As illustrated in FIG. 3, a human editorial actual clickability score is retrieved for only the one or more queries for which sufficient analytics data is not available. A human editorial actual clickability score comprises an actual clickability score that is based upon human editorial judgments of the one or more advertisements displayed in response to a given query. According to one embodiment of the invention, a human editorial judgment of the actual clickability score of a given advertisement displayed in response to a given query comprises one or more terms rating the relevancy of the advertisement with respect to the query. The one or more human editorial judgment terms rating a given advertisement displayed in response to a given query may be mapped or converted to numerical actual clickability scores. Table B illustrates one embodiment of human editorial judgment terms that may be provided for one or more advertisements displayed in response to a given query for which sufficient analytics data is unavailable.

TABLE C

| Human editorial judgment | Numerical actual clickability score |
| --- | --- |
| Perfect | 10 |
| Excellent | 2 |
| Good | 1 |
| Fair | .5 |
| Bad | .1 |

As illustrated in Table B, the one or more human editorial judgment terms may be converted to numerical actual clickability scores. A human editor may provide one or more of the human editorial judgment terms presented in Table C to identify the relevancy of the advertisement with respect to a given query. For example, a human editorial judgment may comprise a rating of "excellent" for the relevancy of a given advertisement with respect to a given query. The human editorial judgment ratings may be converted or mapped to numerical clickability scores, as illustrated in Table C, and used to generate an actual numerical clickability score for the advertisement with respect to the query.

If sufficient data exists for the query selected, a normalized click through rate is calculated for the one or more advertisements displayed in response to the selected query, step 310. A normalized click through rate may be calculated for a given advertisement with respect to the selected query using a normalizing algorithm, which may normalize the click through rate of the advertisement with respect to one or more variables associated with the context of the advertisement. For example, a normalizing algorithm may normalize the analytics data indicating the selection of one or more advertisements with respect to the position of the one or more advertisements in a ranked list of advertisements when displayed in response to a given query. Similarly, a normalizing algorithm may normalize the analytics data indicating the selection of one or more advertisements with respect to the time of day the one or more advertisements were displayed in response to a given query. Exemplary methods for normalizing analytics data for one or more advertisements with respect to one or more variables are described in commonly owned U.S. patent application Ser. No. 11/281,919 entitled "SYSTEM AND METHOD FOR REVENUE BASED ADVERTISEMENT PLACEMENT," the disclosure of which is hereby incorporated by reference in its entirety.

The average normalized click through rate of the one or more advertisements displayed in response to the query is calculated, step 312. A given advertisement is thereafter selected from the one or more advertisements displayed in response to the selected query, step 314. The quotient of the normalized click through rate for the advertisement selected and the average normalized click through rate of the one or more advertisements displayed in response to the query is calculated, step 316. The calculated quotient yields the actual clickability score for the advertisement selected. A check is performed to determine whether an actual clickability score has been calculated for the one or more advertisements displayed in response to the selected query, step 318. If an actual clickability score has not been calculated for the one or more advertisements displayed in response to the selected query, another advertisement is selected, step 314.

When an actual clickability score has been calculated for the one or more advertisements displayed in response to the query, or after a human editorial clickability score has been retrieved for the one or more advertisements displayed in response to the selected query, a check is performed to determine whether one or more queries in the training data set require analysis, step 320. If additional queries require analysis, another query is selected from the training set, step 303. After the one or more queries in the training set have been analyzed, and actual clickability scores have been generated for the one or more advertisements displayed in response to the one or more queries, processing terminates, step 322. As previously described, the clickability scores generated for the one or more advertisements displayed in response to the one or more queries may be used to train one or more predictive clickability functions.

Figure 4:
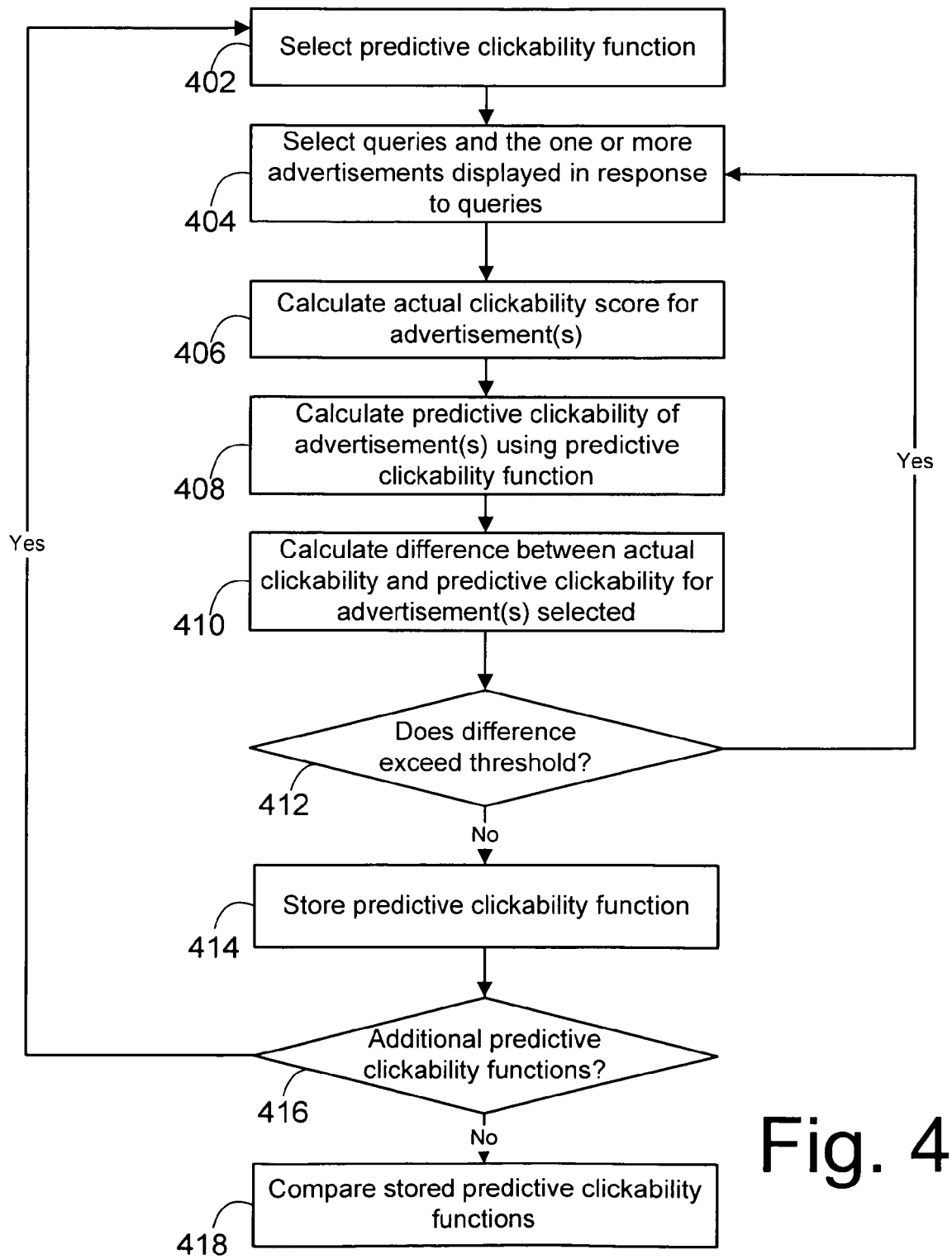
FIG. 4 is a flow diagram presenting a method for determining the accuracy of one or more functions that may be used to predict the clickability of one or more advertisements displayed in response to one or more queries according to one embodiment of the present invention.

FIG. 4 is a flow diagram presenting a method for determining the accuracy of one or more predictive clickability functions using a loss function. According to the embodiment illustrated in FIG. 4, a given predictive clickability function is selected from one or more predictive clickability functions, step 402. One or more queries and one or more advertisements displayed in response to the one or more queries are selected, step 404. An actual clickability score is calculated for the one or more advertisements displayed in response to the one or more queries selected using analytics data associated with the one or more advertisements, step 406.

The predictive clickability function is used to calculate a predicted clickability score for the one or advertisements displayed in response to the one or more selected queries, step 408. The difference between the one or more predicted clickability scores and the actual clickability scores for the one or more advertisements displayed in response to the one or more selected queries are thereafter calculated, step 410. As previously described, the actual clickability scores calculated for the one or more advertisements displayed in response to the one or more queries selected are based upon analytics data associated with the one or more advertisements. Performing a comparison of the predicted clickability scores and the actual clickability scores for the one or more advertisements provides an indication of the accuracy of the predictive clickability function used to generate the predicted clickability scores.

A check is performed to determine whether the difference between the actual clickability scores and the predicted clickability scores for the one or more advertisements exceeds a given threshold, step 412. For example, a check may be performed to determine whether the difference between the sum of the one or more actual clickability scores and the sum of the one or more predicted clickability for the one or more advertisements displayed in response to the one or more queries selected exceeds a given threshold.

If the difference between the actual clickability scores and the predicted clickability scores, as calculated by the selected predictive clickability function, for the one or more advertisements displayed in response to the one or more queries selected exceeds the threshold, additional queries and advertisements displayed in response to the one or more queries are selected and used to further train the selected predictive clickability functions, step 404. Where the difference between the actual clickability scores and the predicted clickability scores for the one or more advertisements displayed in response to the one or more queries selected does not exceed the threshold, the predictive clickability function is stored, step 414. A check is performed to determine whether one or more predictive clickability functions require analysis, step 416. If one or more additional predictive clickability functions require analysis, a next predictive clickability functions is selected, step 402.

After the one or more predictive clickability functions have been analyzed, a comparison of the performance of the one or more predictive clickability functions may be performed, step 418. For example, a comparison may be performed to identify the one or more predictive clickability functions, and the features utilized by such predictive clickability functions, that are the most accurate. The one or more predictive clickability functions may be used to generate a prediction of the clickability of a given advertisement displayed in response to a given query for which no analytics data is available.

Figure 5:
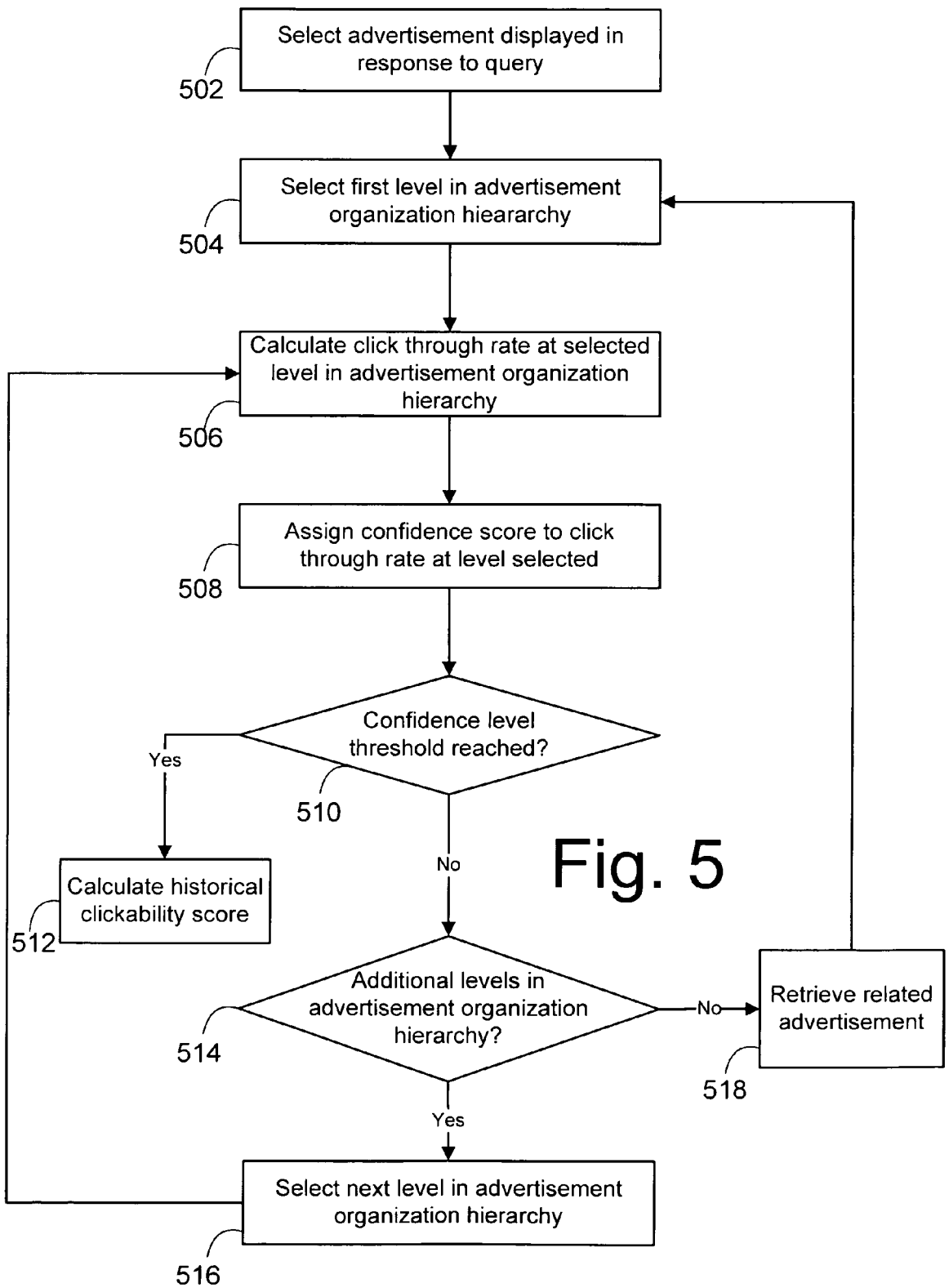
FIG. 5 is a flow diagram presenting a method for calculating a historical clickability score for a given advertisement displayed in response to a given query according to one embodiment of the present invention.

FIG. 5 is a flow diagram presenting one embodiment of a method for calculating a historical clickability score for a given advertisement displayed in response to a given query. According to the embodiment illustrated in FIG. 5, an advertisement displayed in response to a given query is selected, step 502. The first level in an organizational hierarchy to which the advertisement belongs is selected. For example, the first level of an organizational hierarchy may comprise the advertisement itself. A click through rate is calculated for the organizational level of the hierarchy selected using the analytics data associated with the respective level, step 506. For example, a click through rate may be calculated for the advertisement itself using the analytics data associated with the advertisement. Similarly, a click through rate may be calculated for the one or more advertisements comprising the advertisement group to which the selected advertisement belongs.

A confidence score is assigned to the calculated click through rate, step 508. According to one embodiment of the invention, the confidence score is assigned based on the level of the organizational hierarchy from which the analytics data was retrieved to calculate the click through rate. For example, a confidence score may be assigned based upon the specificity of the organizational hierarchy level. Therefore, a confidence score associated with the click through rate corresponding to an advertisement group may be greater than a confidence score associated with the click rate corresponding to an account. According to another embodiment of the invention, the confidence score is assigned based upon the quantity of analytics data associated with the level of the organizational hierarchy for which a click through rate was calculated.

A check is performed to determine whether the combination of confidence scores assigned to the one or more calculated click through rates associated with the one or more levels of the organizational hierarchy to which the advertisements belongs yields a sufficient confidence score, step 510. If the combination of the one or more confidence scores does not satisfy the confidence score threshold, a check is performed to determine whether there are one or more levels within the organizational hierarchy to which the advertisement belongs, step 514. If one or more additional levels are identified, a next level is selected, step 516, and a click through rate is calculated for the selected organizational level.

When a click through rate has been calculated for the one or more levels of the organizational hierarchy to which an advertisement belongs, step 514, but a confidence level threshold is not reached, step 510, an advertisement related to the selected advertisement is retrieved, step 518. According to one embodiment of the invention, a related advertisement comprises an advertisement displayed in response to the query selected, yet belonging to an account to which the selected advertisement does not belong. For example, a related advertisement may comprise an advertisement displayed in response to the query selected yet belonging to a different advertiser.

When the confidence level threshold for the selected advertisement is satisfied, step 510, the historical clickability score for the selected advertisement is calculated, step 512. According to one embodiment of the invention, the historical clickability score is calculated using a weighted sum of the click through rates associated with the one or more levels of the one or more organizational hierarchies. The weight applied to the one or more levels of the one or more organizational hierarchies comprises the confidence score associated with each respective click through rate. For example, the product of the confidence scores and the click through rates for the one or more levels of the one or more organizational hierarchies may be used to calculate a weighted sum. The calculated weighted sum comprises the historical clickability score for the selected advertisement.

Figure 6:
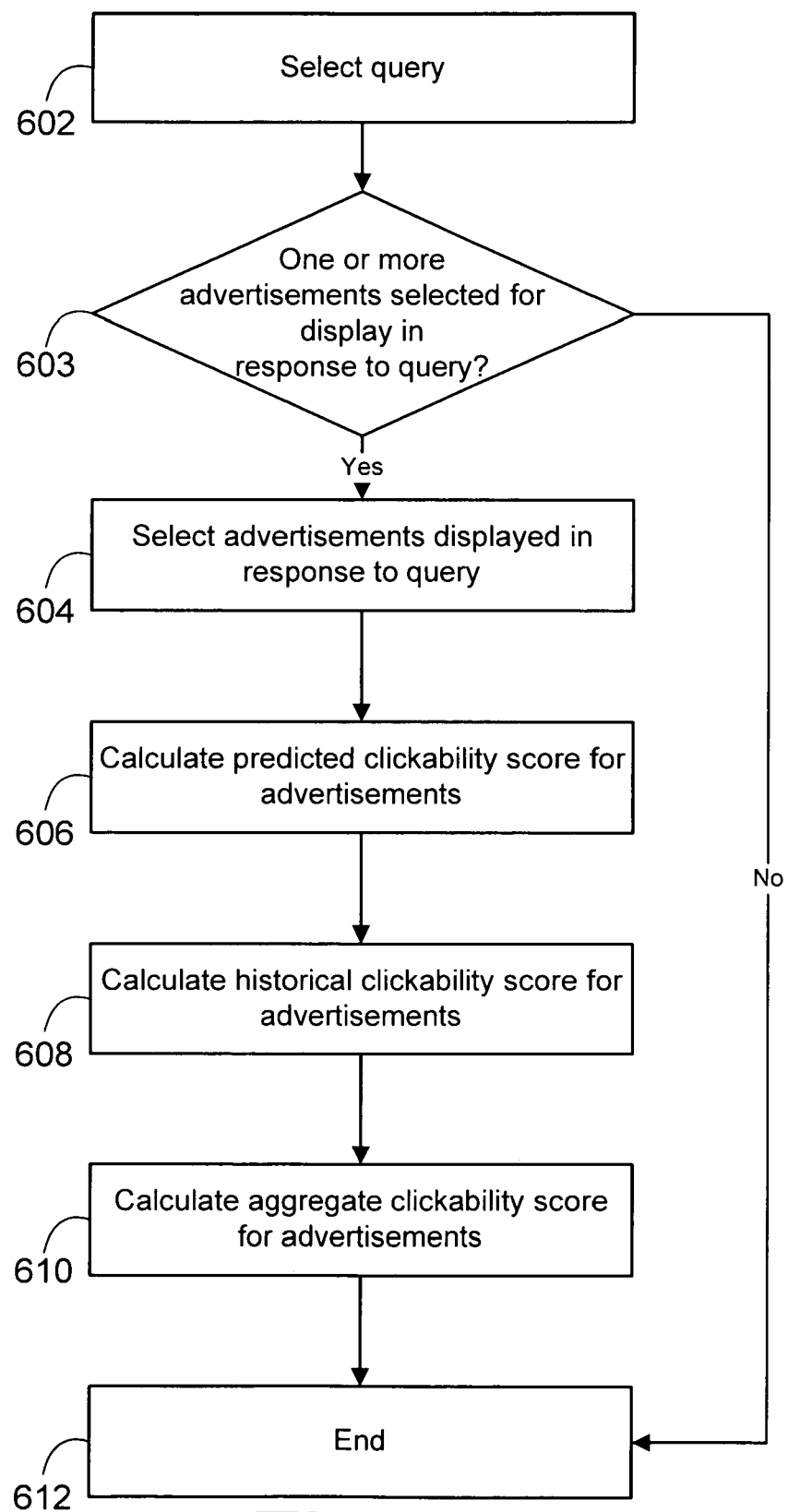
FIG. 6 is a flow diagram presenting a method for calculating an aggregate clickability score for one or more advertisements displayed in response to a given query using predicted clickability scores and historical clickability scores according to one embodiment of the present invention.

FIG. 6 is a flow diagram presenting a method for calculating an aggregate clickability score for one or more advertisements displayed in response to a given query using predicted clickability scores and historical clickability scores associated with the one or more advertisements. A given query is received, step 602, and a check is performed to determine whether one or more advertisements were displayed in response to the received query, step 603. If no advertisements were selected for display in response to the received query, processing terminates, step 612.

Where one or more advertisements were selected for display in response to the received query, the one or more advertisements are retrieved, step 604. A predicted clickability score for the one or more advertisements is calculated using a predicted clickability function that is trained according to methods described herein, step 606. Historical clickability scores for the one or more advertisements are also calculated according to methods described herein, step 608, e.g., using analytics data, such as click through data, from one or more levels of an organizational hierarchy for maintaining advertisements.

The predicted clickability scores and the historical clickability scores for the one or more advertisements are calculated to generate aggregate clickability scores, step 610. Table D illustrates one embodiment of an equation that may be used to calculate an aggregate clickability score using the predicted clickability score and the historical clickability score associated with an advertisement.

TABLE D $$\frac{w\_1 * \text{predicted\_clickability} + (1 - w\_1) * w\_2 * \text{historical\_clickability}}{w\_1 + (1 - w\_1) * w\_2}$$

In the equation presented in Table D, $w\_1$ is the weight applied to the predicted clickability score associated with a given advertisement displayed in response to the selected query. $w\_2$ is the weight applied to the historical clickability score associated with an advertisement displayed in response to the selected query. According to one embodiment of the invention, $w\_2$ comprises a numerical value indicating the reliability of the historical_clickability score, wherein the reliability of a historical clickability score may be based upon the amount of analytics data used to calculate the historical clickability score.

The foregoing description, for purposes of explanation, uses specific nomenclature and formula to provide a thorough understanding of the invention. It should be apparent to those of skill in the art that the specific details are not required in order to practice the invention. The embodiments have been chosen and described to best explain the principles of the invention and its practical application, thereby enabling others of skill in the art to utilize the invention and various embodiments with various modifications as are suited to the particular use contemplated. Thus, the foregoing disclosure is not intended to be exhaustive or to limit the invention to the precise forms disclosed and those of skill in the art recognize that many modifications and variations are possible in view of the above teachings.

We claim:

1. A method for generating one or more functions for predicting a frequency with which an advertisement displayed in response to a query will be selected, the method comprising:

receiving analytics data associated with a display of one or more advertisements in response to one or more queries;

identifying one or more features associated with the one or more advertisements displayed in response to the one or more queries; and generating one or more functions for predicting a frequency with which a given advertisement displayed in response to a query will be selected using the analytics data and features associated with the one or more advertisements displayed in response to the one or more queries.

2. The method of claim 1 wherein the receiving analytics data comprises receiving analytics data indicating the frequency with which a given advertisement was selected when displayed in response to a given query.

3. The method of claim 1 wherein receiving analytics data comprises receiving analytics data indicating the rank at which a given advertisement was displayed in response to a given query.

4. The method of claim 1 wherein identifying one or more features comprises identifying one or more query-independent features for a given advertisement.

5. The method of claim 4 wherein a query-independent feature comprises a characteristic associated with a given advertisement.

6. The method of claim 5 wherein a query-dependent feature comprises a geographic location associated with a given advertisement displayed in response to a given query.

7. The method of claim 5 wherein a query-independent feature comprises information associated with content corresponding to a given advertisement.

8. The method of claim 7 wherein content comprises a landing page.

9. The method of claim 1 wherein identifying one or more features comprises identifying one or more query-dependent features for a given advertisement displayed in response to a given query.

10. The method of claim 9 wherein a query-dependent feature comprises a characteristic associated with a given advertisement and query.

11. The method of claim 10 wherein a query-dependent feature comprises a time a given advertisement was displayed in response to a given query.

12. The method of claim 10 wherein a query-dependent feature comprises a type of match with which a given advertisement was retrieved in response to a given query.

13. The method of claim 10 wherein a query-dependent feature comprises information associated with a user that generated a given query or selected an advertisement displayed in response to the query.

14. The method of claim 13 wherein information associated with a user comprises an Internet Protocol ("IP") address of a user.

15. The method of claim 13 wherein information associated with a user comprises a frequency with which a user selected one or more advertisements during a given time period.

16. The method of claim 13 wherein information associated with a user comprises information identifying one or more preferences associated with a user.

17. The method of claim 13 wherein information associated with a user comprises a geographic location of a given user.

18. The method of claim 1 wherein generating one or more functions comprises:
calculating an actual clickability score for the one or more advertisements displayed in response to the one or more queries; and
generating one or more functions through the use of machine learning using the actual clickability scores and the features associated with the one or more advertisements displayed in response to the one or more queries.

19. The method of claim 18 wherein calculating an actual clickability score comprises calculating an actual clickability score using the analytics data associated with a given advertisement.

20. The method of claim 18 wherein an actual clickability score for a given advertisement comprises a quotient of a normalized click through rate of a given advertisement displayed in response to a given query and an average normalized click through rate of one or more advertisements displayed in response to the query.

21. The method of claim 18 wherein calculating an actual clickability score for the one or more advertisements displayed in response to the one or more queries comprises calculating an actual clickability score using information from a human editor.

22. The method of claim 18 wherein generating one or more functions through the use of machine learning comprises generating one or more functions using one or more boosted decision trees constructed from the actual clickability scores and features associated with the one or more advertisements displayed in response to the one or more queries.

23. The method of claim 18 wherein generating one or more functions through the use of machine learning comprises generating one or more functions using one or more neural networks constructed from the actual clickability scores and features associated with the one or more advertisements displayed in response to the one or more queries.

24. The method of claim 18 wherein generating one or more functions through the use of machine learning comprises generating one or more functions using a linear regression analysis of the actual clickability scores and features associated with the one or more advertisements displayed in response to the one or more queries.

25. The method of claim 18 wherein generating one or more functions through the use of machine learning using the actual clickability scores and the features associated with the one or more advertisements displayed in response to the one or more queries comprises:
identifying one or more advertisements associated with a given classification;
generating one or more functions through the use of machine learning using one or more features common to the one or more advertisements associated with the classification.

26. The method of claim 18 wherein generating one or more functions through the use of machine learning using the actual clickability scores and the features associated with the one or more advertisements displayed in response to the one or more queries comprises:
performing a comparison of two or more advertisements displayed in response to a given query;
identifying one or more features unique to a given advertisement based upon the comparison; and
generating one or more functions through the use of machine learning using the one or more features identified as unique.

27. The method of claim 18 wherein generating one or more functions through the use of machine learning comprises generating one or more functions using information for one or more advertisers associated with the one or more advertisements.

28. The method of claim 18 wherein generating one or more functions through the use of machine learning comprises generating one or more functions using information associated with one or more advertisements with which a given advertisement is displayed.

29. The method of claim 1 comprising generating an aggregate clickability score for the one or more advertisements.

30. A system for generating one or more functions for predicting a frequency with which an advertisement displayed in response to a query will be selected, the system comprising:
an analytics data store operative to store analytics data associated with one or more advertisements displayed in response to one or more queries;
a feature component operative to identify features of the one or more advertisements displayed in response to the one or more queries; and
a clickability engine operative to generate one or more functions for predicting a frequency with which a given advertisement displayed in response to a query will be selected using the analytics data and features associated with the one or more advertisements displayed in response to the one or more queries.

31. The system of claim 30 wherein the analytics data store is operative to store analytics data indicating a frequency with which an advertisement was selected in response to a given query.

32. The system of claim 30 wherein the analytics data store is operative to store analytics data indicating a rank at which an advertisement was displayed in a ranked list of advertisements in response to a given query.

33. The system of claim 30 wherein the feature component is operative to identify one or more query-independent features of a given advertisement displayed in response to a given query.

34. The system of claim 33 wherein a query-independent feature comprises a characteristic of a given advertisement.

35. The system of claim 34 wherein a query-dependent feature comprises a geographic location associated with a given advertisement displayed in response to a given query.

36. The system of claim 34 wherein a query-independent feature comprises information associated with content corresponding to a given advertisement.

37. The system of claim 36 wherein content comprises a landing page.

38. The system of claim 30 wherein the feature component is operative to identify one or more query-dependent features of a given advertisement displayed in response to a given query.

39. The system of claim 38 wherein a query-dependent feature comprises a characteristic of an advertisement and a given query.

40. The system of claim 39 wherein a query-dependent feature comprises a time a given advertisement was displayed in response to a given query.

41. The system of claim 39 wherein a query-dependent feature comprises a type of match with which a given advertisement was retrieved in response to a given query.

42. The system of claim 39 wherein a query-dependent feature comprises a geographic location associated with a given advertisement displayed in response to a given query.

43. The system of claim 39 wherein a query-dependent feature comprises information associated with a user that generated a given query or selected an advertisement displayed in response to the query.

44. The system of claim 43 wherein information associated with a user comprises an Internet Protocol ("IP") address of a user.

45. The system of claim 43 wherein information associated with a user comprises a frequency with which a user selected one or more advertisements during a given time period.

46. The system of claim 43 wherein information associated with a user comprises information identifying one or more preferences associated with a user.

47. The system of claim 43 wherein information associated with a user comprises a geographic location of a given user.

48. The system of claim 30 wherein the clickability engine is operative to:
calculate an actual clickability score for the one or more advertisements displayed in response to the one or more queries; and
generate one or more functions through the use of machine learning for predicting a frequency with which a given advertisement displayed in response to a query will be selected using the actual clickability scores and the features associated with the one or more advertisements displayed in response to the one or more queries.

49. The system of claim 48 wherein the clickability engine is operative to calculate an actual clickability score for the one or more advertisements using the analytics data associated with the one or more advertisements.

50. The system of claim 48 wherein the clickability engine is operative to calculate an actual clickability score for the one or more advertisements using information from a human editor.

51. The system of claim 48 wherein the clickability engine is operative to:
construct one or more boosted decision trees from the actual clickability scores and features associated with the one or more advertisements displayed in response to the one or more queries; and
generate one or more functions through the use of machine learning using the one or more boosted decision trees.

52. The system of claim 48 wherein the clickability engine is operative to:
construct one or more neural networks from the actual clickability scores and features associated with the one or more advertisements displayed in response to the one or more queries; and
generate one or more functions through the use of machine learning using the one or more neural networks.

53. The system of claim 48 wherein the clickability engine is operative to generate one or more functions through the use of machine learning using a linear regression analysis of the actual clickability scores and features associated with the one or more advertisements displayed in response to the one or more queries.

54. The system of claim 48 wherein the clickability engine is operative to generate one or more functions through the use of machine learning using information for one or more advertisers associated with one or more advertisements displayed in response to one or more queries.

55. The system of claim 48 wherein the clickability engine is operative to generate one or more functions through the use of machine learning using information associated with one or more advertisements with which a given advertisement is displayed in response to given query.

56. The system of claim 30 wherein the clickability engine is operative to generate an aggregate clickability score for the one or more advertisements.

57. A method for generating one or more functions for predicting a frequency with which an advertisement displayed in response to a query will be selected, the method comprising:
receiving analytics data associated with a display of one or more advertisements in response to one or more queries;

identifying one or more features associated with the one or more advertisements displayed in response to the one or more queries;

generating one or more functions for predicting a frequency with which a given advertisement displayed in response to a query will be selected using the analytics data and features associated with the one or more advertisements displayed in response to the one or more queries;

generating an aggregate clickability score for the one or more advertisements comprising:

generating a historical clickability score for the one or more advertisements using the analytics data associated with the one or more advertisements, generating a predicted clickability score for the one or more advertisements using the one or more functions for predicting a frequency with which a given advertisement displayed in response to a query will be selected; and combining the historical clickability score and the predicted clickability score.

58. The method of claim 57 wherein generating a historical clickability score comprises:

calculating one or more click through rates for one or more levels of an advertisement organizational hierarchy to which an advertisement belongs;

assigning a confidence score to the one or more calculated click through rates; and combining the one or more click through rates and corresponding confidence scores to generate a historical clickability score.

59. The method of claim 57 wherein generating one or more functions comprises generating one or more functions through the use of machine learning using the historical clickability scores associated with the one or more advertisements.

60. A system for generating one or more functions for predicting a frequency with which an advertisement displayed in response to a query will be selected, the system comprising:

an analytics data store operative to store analytics data associated with one or more advertisements displayed in response to one or more queries;

a feature component operative to identify features of the one or more advertisements displayed in response to the one or more queries; and a clickability engine operative to:

generate one or more functions for predicting a frequency with which a given advertisement displayed in response to a query will be selected using the analytics data and features associated with the one or more advertisements displayed in response to the one or more queries;

generate an aggregate clickability score for the one or more advertisements;

generate a historical clickability score for the one or more advertisements using the analytics data associated with the one or more advertisements;

generate a predicted clickability score for the one or more advertisements using the one or more functions for predicting a frequency with which a given advertisement displayed in response to a query will be selected; and combine the historical clickability score and the predicted clickability score to generate an aggregate clickability score.

61. The system of claim 60 wherein the clickability engine is operative to:

calculate one or more click through rates for one or more levels of an advertisement organizational hierarchy to which an advertisement belongs;

assign a confidence score to the one or more calculated click though rates; and generate a historical clickability score using the confidence score and click through rates associated with the one or more levels of the advertisement organizational hierarchy to which the advertisement belongs.

62. The system of claim 60 wherein the clickability engine is operative to generate one or more functions through the use of machine learning using the historical clickability scores associated with the one or more advertisements.

* * * * *

UNITED STATES PATENT AND TRADEMARK OFFICE
CERTIFICATE OF CORRECTION

| | |
|---|---|
| PATENT NO. | : 7,631,008 B2 |
| APPLICATION NO. | : 11/479186 |
| DATED | : December 8, 2009 |
| INVENTOR(S) | : Carson et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 552 days.

Signed and Sealed this

Second Day of November, 2010

David J. Kappos
*Director of the United States Patent and Trademark Office*